Figure 1:
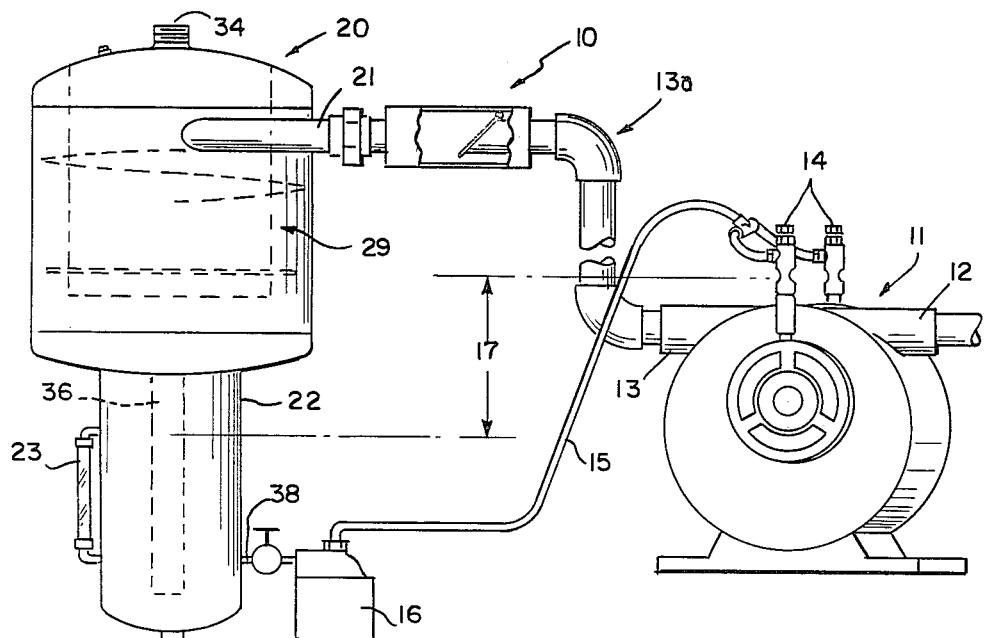

United States Patent [19]

George

[11] 4,263,029
[45] Apr. 21, 1981

[54] OIL RECLAIMER AND MUFFLER ASSEMBLY AND SYSTEM

[75] Inventor: Paul R. George, Cambridge City, Ind.

[73] Assignee: Cego, Inc., Cambridge City, Ind.

[21] Appl. No.: 8,475

[22] Filed: Feb. 2, 1979

[51] Int. Cl.³ .................... B01D 45/16; B01D 17/02
[52] U.S. Cl. .................................. 55/398; 55/399;
55/421; 55/423; 55/437; 55/441; 55/457;
55/459 R; 55/466; 184/6.24; 210/168;
210/512.1
[58] Field of Search ................. 55/274, 276, 355, 383,
55/398–399, 421, 423, 428, 437, 441, 457, 459
R, 466, 473; 209/144, 211; 210/512 R, 168;
184/6.24

[56] References Cited

U.S. PATENT DOCUMENTS

| 441,995 | 12/1890 | Wheeler | 55/459 R X |
|---|---|---|---|
| 1,847,817 | 3/1932 | Cole | 184/6.24 |
| 2,010,435 | 8/1935 | Matheson | 55/315 X |
| 2,913,112 | 11/1959 | Stavenger et al. | 209/211 |
| 3,200,568 | 8/1965 | McNeil | 55/459 R X |
| 3,265,295 | 8/1966 | Cyr | 55/473 UX |
| 3,415,041 | 12/1968 | Kraissl, Jr. | 55/342 |
| 3,428,175 | 2/1969 | Hukki | 209/211 X |
| 3,698,515 | 10/1972 | Dobrowolski | 55/473 X |
| 3,824,040 | 7/1974 | Aronson | 55/421 X |

*Primary Examiner*—Kathleen J. Prunner
*Attorney, Agent, or Firm*—Jenkins, Coffey, Hyland, Badger & Conard

[57] ABSTRACT

A vacuum system includes a vacuum pump, means to provide a flow of lubricant oil to the vacuum pump, and an oil reclaimer and muffler assembly to remove oil that becomes entrained in the gas stream leaving the pump and to permit such oil to be resupplied to the means providing the flow of lubricant to the pump. The oil reclaimer and muffler assembly includes an outer casing having an inlet for the gas stream from the vacuum pump. Wall means are provided within the outer casing to form a passageway to circulate the gas stream adjacent the inner wall of the casing. Entrained oil and water from the gas pump are collected on the inner walls of the assembly and flow under the influence of gravity to a collection pipe at one end of the assembly. The inner wall means also forms a passageway from adjacent the bottom of the assembly to its top from which the cleaned gas passes. The reclaimed oil and water that are collected within the assembly accumulate in an oil reservoir from which the collected oil can be withdrawn for use in lubricating the vacuum pump.

3 Claims, 2 Drawing Figures

OIL RECLAIMER AND MUFFLER ASSEMBLY AND SYSTEM

This patent relates to an oil reclaimer and muffler assembly and system, and particularly one adapted for use with modern day dairy farm vacuum pumps.

In the operation of a vacuum pump system, it is frequently necessary or advisable to provide a supply of lubricant oil to the bearing and moving parts within the pump. The use of such lubricant extends the life of the pump by preventing wear on the moving parts within the pump. In the operation of such systems, however, the expensive lubricant becomes entrained in the gas stream leaving the outlet of the vacuum pump and will be lost in its exhaust unless reclaimed. Furthermore, the outlet of the vacuum pump represents a source of noise which is desirably muffled. This invention is a new structure for simultaneously reclaiming expensive lubricant for a vacuum pump and resupplying it to a vacuum pump in a closed system while acting as a muffler for vacuum pump noise.

Prior patents relating to such systems include U.S. Pat. Nos. 1,860,238; 2,496,676; 3,811,251; 3,837,432; 3,845,840; 3,901,670; 4,033,428 and 4,050,237. Most of the systems disclosed in these patents use some type of foam, fiber or other material to pass the gas through to help separate the oil from the gas. Any use of such materials is disadvantageous particularly in dairy farm vacuum systems, because the exhausted gas from such systems contains a mixture of oil, water and dust that has a rapid clogging action on the filter-like materials. U.S. Pat. No. 2,496,676, while showing a combination muffler and oil reclaimer built within a small diaphragm pump, uses such filter materials. U.S. Pat. No. 1,860,238 discloses a spiral gas and oil separator without such materials for use in connection with oil and gas wells, and U.S. Pat. No. 4,033,428, for example, shows a muffler designed to take oil out of air being fed to a pneumatic tool. In contrast to the systems disclosed in the above patents, this invention provides a novel oil reclaimer and muffler structure particularly adapted for use in dairy farm vacuum systems and providing a closed cycle for the use and reclamation of vacuum pump lubricant.

This invention provides in a vacuum system an oil reclaimer and muffler assembly including a casing with an inlet for the gas stream from the vacuum pump. Within the casing inner wall means form a passageway to circulate the gas stream adjacent the inner surface of the casing to provide for the collection of oil and condensed water vapor from the gas stream on the inner surfaces. The inner surfaces of the casing and inner wall means provide a flow of the collected oil and water under the influence of gravity to a collector pipe at one end of the oil reclaimer and muffler assembly. The inner wall means also forms a passageway from adjacent the bottom of the assembly to the top of the assembly for exhaust of cleansed gas. An oil reservoir is provided at the bottom of the assembly encompassing the oil collection pipe and is provided with an opening from which the reclaimed oil can be withdrawn for use in the vacuum pump. A transparent water collection pipe is attached to the bottom of the oil reservoir and provided with a valve to permit withdrawal of collected water which, by virtue of its density, collects at the lowest point of the assembly.

More specifically, such an assembly includes a casing which is cylindrical in shape. The inner wall means comprises an open-ended cylinder coaxially mounted within the casing and a spiral wall means and an annular ring. The inner cylinder is shorter than the length of the outer cylinder and is supported within the outer casing adjacent its upper end to provide a chamber at the lower end of the assembly. The spiral wall and annular ring means are mounted on the inner cylinder in the space between the inner surface of the outer casing and the inner cylinder, and the inlet for the gas stream from the vacuum pump directs the gas stream tangent to the inner surface of the outer casing and into the spiral passageway formed thereby. The gas stream and entrained oil and water are thus circulated in the upper portion of the casing adjacent its inner surface to provide for the reclamation of entrained oil and collection of entrained water from the gas stream prior to its exhaust from within the casing. The inner cylinder also provides, through its interior, a passageway for the gas stream leading from the chamber adjacent the bottom of the casing to the exhaust outlet opening at the top of the casing. The casing is otherwise preferably closed at its upper end by a bell-shaped closure. The casing is closed at its lower end by a funnel-like or bell-shaped closure with the oil collection pipe opening at its low point, and the oil, and water collection reservoirs are carried by this closure. A plurality of vanes may be provided on the lower closure to direct oil flowing through the influence of gravity to the oil collection pipe.

In, for example, a dairy farm vacuum system such an oil reclaimer and muffler assembly would be used by connecting its inlet with the outlet of the vacuum pump, thus directing gas leaving the vacuum pump and any entrained lubricant and water to the oil reclaimer and muffler assembly. The oil reservoir of the assembly would be connected to means to deliver lubricant from the reservoir to within the vacuum pump. Thus, oil that may be entrained in gas leaving the vacuum pump is reclaimed for use as lubricant. Water vapor carried from the outlet of the vacuum pump is collected in the oil reclaimer and muffler assembly in the transparent water collection pipe mounted below the oil reseriot, and because of its greater density is directed down the oil collection pipe of the assembly into the transparent water collection pipe from which it may be withdrawn by the system user. The oil reservoir may be provided with a sight gauge to determine when it is necessary to add oil to the system.

Figure 2:
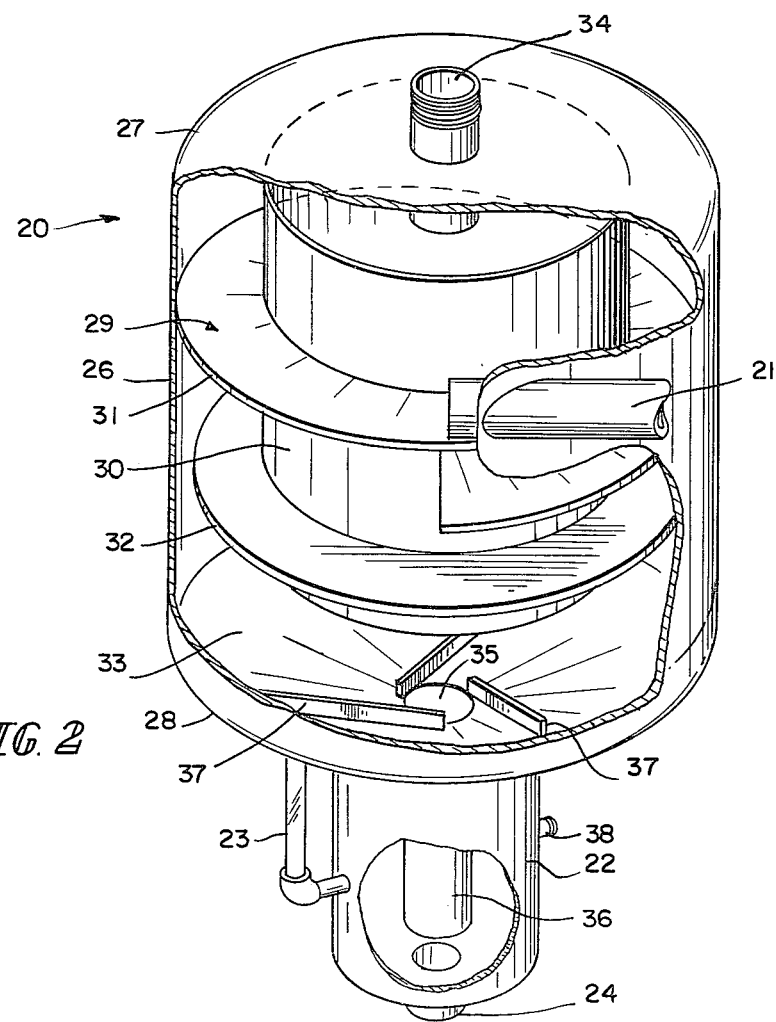

Other features of the invention will be apparent from the figures and description which follow:

FIG. 1 is a drawing of a system using the oil reclaimer and muffler assembly; and FIG. 2 is a partial cross-sectional perspective view showing the structure of the oil reclaimer and muffler assembly.

As shown in FIG. 1 the system 10 includes a vacuum pump 11 having an inlet 12 and an outlet 13. Means 14, such as a needle valve with flow sights or other valve means, are used to deliver a supply of lubricant, such as lubricating oil, within the vacuum pump 11. The oil reclaimer and muffler system 20 is connected with its inlet 21 in communication with the outlet 13 of the vacuum pump by piping 13a. As will be described oil and water entrained in a gas stream leaving the outlet 13 of the vacuum pump 11 will be reclaimed within the oil reclaimer and muffler assembly 20 and collected within the oil reservoir 22. A flow of oil from the oil reservoir 22 is provided to the means 14 to deliver oil within the vacuum pump 11, typically by a flexible plastic hose 15, such as nylon or polyethylene hose. An oil filter 16 may be provided between the oil reservor 22 and the means 14. The quantity of lubricant available to the system and contained within the oil reservoir 11 can be monitored by means of a sight gauge 23 mounted at the side of the oil reservoir. Water collected within the oil reclaimer and muffler assembly 20 is collected in a transparent water collection pipe 24 at the bottom of the assembly where it may be withdrawn from the system by opening valve means 25 by the system user as appropriate. Such a system permits the reclamation of the expensive oil lubricant and its use in a continuous cycle in the vacuum system.

The specific structure of the oil reclaimer and muffler assembly 20 of this invention is shown in FIG. 2. Oil and water entering the inlet 21 of the assembly 20 is removed from the gas stream and collected, respectively, in the oil reservoir 22 and the transparent water collection pipe 24. The assembly includes a casing 26, preferably cylindrical in shape, closed at its ends by a pair of bell-shaped closures 27 and 28. Inner wall means 29 form a passageway within the casing 26 to circulate the gas stream entering inlet 21 adjacent the inner surface of casing 26. The inner wall means preferably includes an inner cylinder 30 that is shorter than the length of the cylindrical casing 26 and is mounted coaxially within the cylindrical outer casing 26 adjacent the end 27 to be mounted in the uppermost position, and further includes spiral wall means 31 and an annular ring 32 that extends from the inner cylinder 30 toward the inner surface of casing 26 to define the spiral passageway within the assembly.

The inner cylinder 30 is open at its lower end, and the upper edge of inner cylinder 30 and closure 27 define the uppermost limit of a spiral passageway adjacent the inner wall of the casing 26. Mounted adjacent the lower edge of the inner cylinder 30 is an annular ring 32 having a width insufficient to extend fully between the inner cylinder 30 and the inner surface of the outer casing 26, thereby permitting oil and water collected within the assembly 20 to flow to the bottom closure 28 of the assembly, and further permits the gas to flow to a chamber 33 thus formed within the assembly 20 below the lower edge of the inner cylinder 30. The interior of inner cylinder 30 provides a passageway for the gas from which the oil has been reclaimed, which has been directed to chamber 33, to flow upwardly through the inner cylinder 30 to the exhaust opening 34 at the top of the assembly 20.

Oil and water collected within the assembly flow under the influence of gravity in the space between the inner wall means and the casing to the bell-shaped and funnel like lower closure 28 which includes an opening 35 communicating with the oil collection pipe 36 which is encompassed by the oil reservoir 22. Closure 28 may be provided with vanes 37 to direct the oil to the opening 35. The collection pipe 36 directs oil and water collected within the assembly 20 to adjacent the bottom of oil reservoir 22. Any water collected within the assembly, being more dense than the lubricating oil, flows into the transparent water collection pipe 24 at the bottom of assembly 20 where the extent of the water collection may be observed. As shown in FIG. 1, at the bottom of the water collection reservoir 24 a valve 25 is provided to permit withdrawal of collected water when it becomes excessive. The amount of oil within the oil reservoir 22 may be monitored by a transparent sight guage 23 mounted in the side of the oil reservoir 22. The oil reservoir 22 is further provided with a fitting 38 to permit withdrawal of the oil from the reservoir as needed. Such an assembly, typically on the order of 28 to 30 inches overall in height with the casing being about 20 inches in height and 15 inches in diameter, may be used advantageously with vacuum pumps with 3 horsepower to 10 horsepower in capacity. In such an assembly it has been found advantageous that the inner cylinder and circulating passageways extend from adjacent the top of the assembly to within 2 or 3 inches of the bottom closure 28, and, thus, the inner cylinder 30 may be two-thirds to three-fourths as long as the outer cylinder 26 making up the casing. The oil reservoir may be typically 10 inches in height and approximately 6 inches in diameter to provide an adequate supply of lubricant for pumps with 3 to 10 horsepower capacity. The structure of such an assembly is typically formed of metal parts joined together by welding or other such metal-joining processes. The sight gauge 23 for the oil reservoir 22 may be plastic tubing carried between a pair of appropriate fittings to avoid breakage. Nylon or polyethylene tubing about one quarter of an inch in diameter is suitable for such use. The transparent water collection pipe 24 may likewise be formed of transparent plastic tubing.

The oil reclaimer and muffler assembly described above is particularly advantageous when used in dairy farm vacuum systems which may be exposed to a substantial dust environment. In a vacuum system the oil reclaimer and muffler assembly can provide a continuous flow of lubricant to the vacuum pump and muffle the noise associated with its exhaust. Such an oil reclaimer and muffler assembly can provide 40 to 70 drops per minute to lubricate the bearings and vanes of a rotary vacuum pump. In such a system, as shown in FIG. 1, the oil is preferably filtered, as by filter 16, upon leaving the oil reservoir 22 before delivery to the vacuum pump. Standard oil filters may be used for this purpose. If it is necessary to add oil to the system this may be easily and conveniently done by pouring the oil into the exhaust opening 34 at the top of the oil reclaimer and muffler assembly 20. In a system such an oil reclaimer and muffler assembly is preferably located close to the vacuum pump with the distance 17 (FIG. 1) between the top of the oil reservoir and the top of the vacuum pump being 5 to 10 inches. The noise associated with the exhaust of a vacuum pump is substantially reduced by use of the structure of this invention in such a system.

I claim:

1. In a vacuum system including a vacuum pump having lubricating oil and water vapor entrained in its outlet gas stream and means to deliver a flow of lubricating oil to the vacuum pump, the improvement comprising a vertically disposed oil reclaimer and muffler assembly for the gas stream leaving the vacuum pump, said assembly including a cylindrical casing having an inlet for the gas stream connected with the outlet of the vacuum pump, inner wall means to circulate the gas stream adjacent the inner surface of the casing and to provide for collection of oil and condensed water vapor within the assembly comprising an inner cylinder coaxially mounted within the casing with spiral wall means and an annular ring located thereon between said casing and said inner cylinder and forming a spiral passageway leading from the inlet to a chamber below the inner wall means, said inlet entering the casing tangent to its inner surface to direct the gas stream from the vacuum pump into the spiral passageway, said inner cylinder forming at its interior an internal passageway for the gas stream leading from the chamber to an exhaust opening at the top of said assembly, said casing and inner wall means permitting flow of collected oil and water down the inner surface under the influence of gravity to a collection pipe and thereby to an oil reservoir enclosing said collection pipe, said casing at its bottom being formed by a bell-shaped closure with the collection pipe at its lowest point, said oil reservoir being a cylindrical housing with the collection pipe for oil and water leading to adjacent its lowest point and having a separate transparent water collection pipe attached at its bottom, said oil reservoir being provided with a fitting located above the bottom of the oil reservoir for reclaimed oil that is connected with said means to deliver a flow of lubricating oil to the vacuum pump.

2. In a vacuum system including a vacuum pump and means to deliver a flow of lubricating oil to the vacuum pump, and having lubricating oil and water vapor entrained in a gas stream leaving the vacuum pump, the improvement comprising an oil reclaimer and muffler assembly having an inlet connected with the gas stream leaving the vacuum pump and having upper and lower portions, said assembly including a cylindrical casing having the inlet for the gas stream from the vacuum pump, an inner cylinder coaxially mounted within the casing, spiral passage-forming means mounted on the inner cylinder leading from the inlet to a chamber below the inner cylinder, said inlet directing the gas stream from the vacuum pump into the spiral passageway and tangent to the inner surface of the cylindrical casing and circulating the gas stream adjacent the inner surface of the casing to provide for collection of oil and condensed water within the assembly, said inner cylinder forming at its interior a passageway for the gas stream leading from the chamber below the inner cylinder to an exhaust outlet opening at the upper portion of the assembly, said casing and spiral passage-forming means permitting the flow of collected oil and water under the influence of gravity down the casing to its lower portion, said lower portion of the casing being formed by a bell-shaped closure with a collection pipe at its lowest point, a cylindrical oil reservoir housing the oil collection pipe with the collection pipe leading to adjacent the lowest point of the oil reservoir, a separate transparent water-collection pipe attached at the bottom of the oil reservoir, and a fitting provided on the oil reservoir for reclaimed oil that is connected with said means to deliver a flow of lubricating oil to the vacuum pump.

3. An oil reclaimer and muffler assembly comprising an outer cylindrical casing having an inlet and closures at each end, one of said closures defining a top of the assembly and an exhaust opening, and the other closure having a funnel shape and defining an oil-collection opening at its lowest point and carrying in communication with the oil-collection opening, a collection pipe, a plurality of vanes surrounding the collection opening and collection pipe, and an oil reservoir encompassing the collection pipe, an inner cylindrical wall means carried within the outer cylindrical casing adjacent the closure forming the exhaust opening and carrying a spiral passage-forming means extending from the inner cylindrical wall means toward the inner surface of the outer cylindrical casing, said inner cylindrical wall means being of lesser length than said outer cylindrical casing, and being open at its lower end to form a cylindrical passgeway within the inner cylindrical wall means leading from a chamber formed at the bottom of the outer cylindrical casing to the exhaust opening, said inner cylindrical wall means carrying an annular plate below the spiral passage-forming means and adjacent the chamber, said annular plate having a width insufficient to extend to the outer cylindrical casing to provide a narrow annular passage for a gas stream and for collected oil and water adjacent the inner surface of the outer cylindrical casing whereby oil and water collected within the assembly is permitted to flow under the influence of gravity to the oil-collection opening for collection in the oil reservoir, said oil reservoir having a fitting located above its lower surface for withdrawal of the oil collected therein.

* * * * *

UNITED STATES PATENT AND TRADEMARK OFFICE
CERTIFICATE OF CORRECTION

PATENT NO. : 4,263,029
DATED : April 21, 1981
INVENTOR(S) : Paul R. George

It is certified that error appears in the above-identified patent and that said Letters Patent are hereby corrected as shown below:

Line 17 of the Abstract, "cleaned" should be -- cleansed --.

Column 2, line 27, delete the comma after "oil" and before "and"; line 43, "reservoir" is misspelled.

Column 3, line 6, "reservoir 11" should be -- reservoir 22 --.

Signed and Sealed this

Twenty-second Day of September 1981

[SEAL]

Attest:

Attesting Officer

GERALD J. MOSSINGHOFF

Commissioner of Patents and Trademarks